United States Patent Office 3,704,263
Patented Nov. 28, 1972

3,704,263
HYDROLYSIS OF ETHYL SILICATE
Jacob Rosin, Maplewood, N.J., assignor to Stauffer
Chemical Company, New York, N.Y.
No Drawing. Continuation-in-part of application Ser. No.
244,261, July 7, 1965, which is a continuation-in-part
of application Ser. No. 462,134, Dec. 13, 1962. This
application Feb. 28, 1969, Ser. No. 803,396
Int. Cl. B01g 13/00
U.S. Cl. 252—309
3 Claims

ABSTRACT OF THE DISCLOSURE

Method of preparing a stable solution of hydrolyzed ethyl silicate in ethanol having special utility as a binder for comminuted solids in mold making. The method is particularly distinguished in that an extremely low concentration of acid catalyst is employed in the hydrolysis.

This application is a continuation-in-part of application Ser. No. 462,134 which was filed June 7, 1965 as a continuation-in-part of application Ser. No. 244,261 filed Dec. 13, 1962 and now abandoned. It is intended that application Ser. No. 462,134 be considered abandoned on acceptance of the present application.

The present invention relates to a process for hydrolyzing ethyl silicate in ethanol. By the term "ethyl silicate" as used herein is meant any of the commercially available forms of ethyl silicate, including monomeric ethyl silicate, "condensed" ethyl silicate, and ethyl silicate "40." "Condensed" ethyl silicate is primarily monomeric ethyl silicate plus up to about 15 percent polymerized ethyl silicate. Ethyl silicate "40" contains about 40 percent $SiO_2$, whereas the $SiO_2$ content of monomeric ethyl orthosilicate is of the order of 29 percent.

In accordance with the present invention, there is used in the hydrolysis of the ethyl silicate a quantity of water not in excess of that stoichiometrically required to completely hydrolyze the ethyl silicate but not less than that required for substantially 75 percent hydrolysis thereof. In general, compositions as preferably prepared by the procedure of the invention contain the ethyl silicate in a state of 80–95 percent hydrolysis.

It is highly desirable that hydrolyzed alcoholic solutions of ethyl silicate as used in the precision casting industry for mold making be prepared by the ethyl silicate manufacturer or processor rather than immediately before use at the site of the foundry. This is true because considerable care under controlled conditions is required in the hydrolysis and because of variances in water quality throughout the country.

In order to satisfy the indicated need, it is manifestly essential that the hydrolyzed ethyl silicate binder possess a reasonably long shelf-life. As prepared at the foundry, such binders tend to polymerize rapidly, the polymerization being marked by an increase in viscosity with final solidification to a gel. This condition is aggravated by higher temperatures which often cannot be avoided at a foundry and higher $SiO_2$ concentrations in the binder which are often desirable.

The invention herein is predicated on the discovery that hydrolyzed alcoholic ethyl silicate solutions of the requisite stability may be prepared by reducing the concentration of mineral acid used as the catalyst in the hydrolysis of the ethyl silicate to a very low amount—much lower than the amount which has been customarily employed in foundry practice. It has been determined that there is a distinct optimum in the concentration of mineral acid catalyst and that if the mineral acid concentration is further reduced, the stability of the solution starts to decrease. Concretely, it has been found that the highest stability is reached between acid concentrations of 0.133–2.65 milliequivalents of strong mineral acid per liter.

Since the solutions here involved are alcoholic, pH measurements when determined with the usual commercial pH-meters are inaccurate. However, using Accutint fractional indicator papers the pH range of the solutions herein is established as being of the order of 2.0–3.5. Optimum stability is attained by a concentration of 1.3 milliequivalents of strong mineral acid per liter, which corresponds to pH 2.4.

Using the low acid concentrations, the catalytic effect on the hydrolysis is relatively weak, so that the hydrolysis proceeds slower than usual. Accordingly, the rate of water addition must be slowed relative to conventional practice if the formation of a two-phase system of ethyl silicate and water is to be avoided. It has been found that if such system is allowed to persist for any length of time (the time period being a function of the acid concentration and hydrolysis temperatures), an irreversible precipitation of solid silica particles will occur, and this will interfere with the quality of the alcosol, which is desirably a brilliantly clear solution.

Since the hydrolysis proceeds more rapidly at higher temperatures, the time over which the water is added varies with the temperature at which the hydrolysis is carried out. It is difficult to establish a definite rule for the rate of water addition, but the proper rate is easily determined by observing the incipient formation of the two-phase system and avoiding adding the water faster than the reaction occurs. Naturally, no harm is done if the rate of addition is slowed. In some cases where silica precipitation occurs, it is possible through separation of the precipitate by filtration to still obtain a commercially usable and stable product.

As previously indicated, the quantity of water employed is determined by the extent to which it is desired to hydrolyze the ethyl silicate. Taking a given degree of hydrolysis, the required quantity of water is readily determined from the amount required for complete hydrolysis. Using monomeric ethyl orthosilicate, two moles of water per mole of silicate is necessary for complete hydrolysis. Where the ethyl silicate is in polymeric form, complete hydrolysis demands use of one mole of water for every two ethoxy groups contained in the polymer.

In order to demonstrate the stability of hydrolyzed ethyl silicate solutions at the low acid concentrations here contemplated, 20 percent $SiO_2$ alcosols were prepared using various amounts of HCl. Each solution was refluxed over an extended time period and the increase in viscosity determined periodically with the following results:

| Concentration of HCl (meq./l.) | Viscosity in centistokes at 25° after refluxing at— | | | | | | | | | |
|---|---|---|---|---|---|---|---|---|---|---|
| | Original | 40 hrs. | 56 hrs. | 74 hrs. | 120 hrs. | 144 hrs. | 168 hrs. | 216 hrs. | 264 hrs. | 312 hrs. |
| 5.3 | 3.04 | 3.40 | 3.58 | 3.87 | 4.59 | 5.14 | 5.98 | 9.1 | 80.0 | Gel |
| 2.65 | 3.08 | 3.21 | 3.37 | 3.59 | 4.13 | 4.57 | 5.08 | 6.56 | 9.21 | 17.9 |
| 1.3 | 3.07 | 3.07 | 3.18 | 3.36 | 3.75 | 4.06 | 4.45 | 5.38 | 7.04 | 10.9 |
| 0.53 | 3.13 | 3.20 | 3.32 | 3.49 | 3.96 | 4.35 | 4.89 | 6.32 | 8.87 | 28.8 |
| 0.265 | 3.28 | 3.26 | 3.36 | 3.52 | 3.97 | 4.31 | 4.83 | 6.13 | 8.84 | 18.0 |
| 0.133 | 3.21 | 3.38 | 3.51 | 3.64 | 4.17 | 4.62 | 5.10 | 6.51 | 9.1 | 1.52 |
| 0.053 | 3.32 | 3.60 | 3.77 | 4.02 | 4.76 | 5.39 | 6.39 | | | Gel |
| 0.016 | 3.28 | 5.22 | 11.0 | Gel | | | | | | |

The invention is further illustrated by the following examples which are not to be taken as in any way limitative:

EXAMPLE 1

To a mixture of 479 g. monomeric ethyl silicate and 123 g. anhydrous ethanol containing 36.3 mg. HCl (corresponding to 1.3 milliequivalents HCl/l. in the final solution), 77 g. $H_2O$ was added gradually over a period of 12 minutes while maintaining a 25° C. temperature through external cooling. The rate of the water addition was such that the solution remained brilliant without the formation of a silica precipitate. With all of the water added, the solution was left overnight at room temperature to complete the hydrolysis. 92.8 percent of the ethyl silicate in the product was in hydrolyzed form.

Alcosols so prepared on an industrial scale were kept at room temperature for 3 months. During this period, they increased in viscosity from an original 3.11 centistokes at 25° C. to only 3.55 centistokes and performed exceedingly well as binders for refractory particles after this long period.

EXAMPLE 2

The procedure of Example 1 is followed using 7.3 mg. HCl (corresponding to 0.265 milliequivalents/l.). The rate of water addition must be slowed to prevent silica precipitation.

EXAMPLE 3

The same concentration of acid is utilized as in Example 2, but instead of maintaining a temperature of 25° C., the solution is held at reflux (82–87° C.) during the water addition. This makes it possible to reduce the time of water addition to 4 minutes.

EXAMPLE 4

The experiment of Example 1 is repeated using "condensed" ethyl silicate and ethyl silicate "40." The amount of water employed is gauged to achieve substantially the same degree of hydrolysis. Similar results are obtained.

EXAMPLE 5

Example 1 is repeated with the acid added to solution in the water employed. Similar results are obtained.

The invention claimed is:

1. A process for the preparation of a hydrolyzed solution of ethyl silicate in ethanol consisting essentially of mixing an ethyl silicate containing at least 29 percent $SiO_2$ with ethanol and thereafter adding water and hydrochloric acid at a rate which will avoid precipitation of silica, the amount of water being sufficient to hydrolyze at least 75 percent, but not in excess of that stoichiometrically required to completely hydrolyze the ethyl silicate and the amount of acid being from 0.133 to about 2.65 milliequivalents per liter of the mixture.

2. A process conforming to claim 1 when the concentration of hydrochloric acid is about 1.3 milliequivalents per liter of the mixture.

3. The process of claim 1 in which the ethyl silicate is first mixed with ethanol and hydrochloric acid and thereafter sufficient water is added to hydrolyze at least 75 percent but not in excess of that required to completely hydrolyze the ethyl silicate.

References Cited

UNITED STATES PATENTS

| | | | |
|---|---|---|---|
| 2,285,449 | 6/1942 | Marshall | 252—306 |
| 2,524,358 | 10/1950 | Robey | 106—287 |
| 2,601,123 | 6/1952 | Moulton | 106—287 |

JOHN D. WELSH, Primary Examiner

U.S. Cl. X.R.

252—313